US010975992B1

(12) United States Patent
Totushek et al.

(10) Patent No.: US 10,975,992 B1
(45) Date of Patent: Apr. 13, 2021

(54) LIQUID MANURE HOSE COUPLER

(71) Applicant: Principle CNC Mfg, Inc., Norwood Young America, MN (US)

(72) Inventors: Dennis L. Totushek, Watertown, MN (US); Daniel W. Schug, Hamburg, MN (US)

(*) Notice: Subject to any disclaimer, the term of this patent is extended or adjusted under 35 U.S.C. 154(b) by 240 days.

(21) Appl. No.: 16/024,698

(22) Filed: Jun. 29, 2018

Related U.S. Application Data

(60) Provisional application No. 62/528,099, filed on Jul. 1, 2017.

(51) Int. Cl.
| F16L 21/02 | (2006.01) |
| F16L 23/04 | (2006.01) |
| F16L 21/06 | (2006.01) |
| F16L 33/02 | (2006.01) |

(52) U.S. Cl.
CPC .............. F16L 21/02 (2013.01); F16L 21/065 (2013.01); F16L 23/04 (2013.01); F16L 33/023 (2013.01)

(58) Field of Classification Search
CPC ......... F16L 21/02; F16L 23/04; F16L 21/065; F16L 33/20; F16L 33/207; F16L 33/2071; F16L 33/23
USPC .................................................. 285/256, 259
See application file for complete search history.

(56) References Cited

U.S. PATENT DOCUMENTS

| 144,997 A | * | 11/1873 | Mayall | F16L 33/02 |
| | | | | 285/252 |
| 280,169 A | | 6/1883 | Gerhauser | |
| 756,350 A | | 4/1904 | Garbutt | |
| 925,013 A | | 6/1909 | Morrison | |
| 1,607,943 A | | 11/1926 | Carson et al. | |
| 1,649,594 A | | 11/1927 | Johnson | |
| 1,830,782 A | | 11/1931 | Burnish et al. | |
| 1,854,855 A | | 4/1932 | Kisaburo | |
| 1,857,297 A | | 5/1932 | Faulkner | |

(Continued)

FOREIGN PATENT DOCUMENTS

| DE | 29713845 U1 | * | 10/1997 | ............ F16L 13/143 |
| FR | 1558355 A | * | 2/1969 | .............. F16L 33/20 |

OTHER PUBLICATIONS

"HD Ringlock Clamp for Shug Grip Couplers", 5 pgs, http://www.irrigationsupplyparts.com/product/hd-ringlock-clamp-for-shug-grip-couplers/, downloaded May 15, 2017.

(Continued)

*Primary Examiner* — James M Hewitt, II
(74) *Attorney, Agent, or Firm* — Albert W. Watkins

(57) ABSTRACT

A hose coupler optimally configured for use with a liquid manure drag hose has a pair of hose coupler ends that are joined using a hose coupler having minimal protrusions and diameter. Each of the hose coupler ends is provided with a plurality of ribs and grooves. These ribs and grooves are arranged to mate with corresponding grooves and ribs formed in a collar. For each hose coupler end, a pair of collars are preferably used to secure a hose thereto. The ribs and grooves are preferably configured to secure the hose and distribute tension applied to the hose throughout the coupler end, while ensuring that the hose wall integrity is maintained. The resulting coupler is compatible with heavier drag hose, will not interfere with or harm the hose during winding and unreeling, and will produce less drag and be less likely to produce interference with obstacles in the field.

10 Claims, 3 Drawing Sheets

(56) References Cited

U.S. PATENT DOCUMENTS

| | | | |
|---|---|---|---|
| 1,935,425 A | 11/1933 | Wiggins | |
| 1,996,855 A | 4/1935 | Cheswright | |
| 2,028,182 A | 1/1936 | Barnickol, Jr. | |
| 2,166,524 A * | 7/1939 | Goodall | F16L 33/23 285/253 |
| 2,248,576 A * | 7/1941 | McConnohie | F16L 33/24 285/245 |
| 2,259,453 A | 10/1941 | Beyer et al. | |
| 2,474,431 A | 6/1949 | Lipman et al. | |
| 2,725,246 A | 11/1955 | Weinhold | |
| 2,778,662 A | 1/1957 | Smith | |
| 2,788,993 A * | 4/1957 | Oldham | F16L 23/10 285/148.13 |
| 2,821,415 A | 1/1958 | Race, Jr. | |
| 2,962,305 A | 11/1960 | McCarthy et al. | |
| 3,006,663 A | 10/1961 | Bowne | |
| 3,056,617 A | 10/1962 | Snoddy | |
| 3,495,853 A | 2/1970 | Furrer | |
| 3,679,241 A | 7/1972 | Hoffmann | |
| 3,737,179 A | 6/1973 | White | |
| 3,794,360 A * | 2/1974 | Bachle | B01D 63/06 285/256 |
| 3,967,837 A | 7/1976 | Westerlund et al. | |
| 4,139,224 A * | 2/1979 | Leach | F16L 33/23 24/284 |
| 4,300,792 A | 11/1981 | Donnelly | |
| 4,480,860 A | 11/1984 | Foresta et al. | |
| 4,538,839 A | 9/1985 | Ledgerwood | |
| 4,564,201 A | 1/1986 | Hannah | |
| 4,607,867 A * | 8/1986 | Jansen | F16L 33/221 285/242 |
| 4,758,029 A * | 7/1988 | Davis | F16L 33/01 285/253 |
| 5,004,275 A | 4/1991 | Miller | |
| 5,098,134 A | 3/1992 | Monckton | |
| 5,176,409 A | 1/1993 | Brooks | |
| 7,384,074 B2 * | 6/2008 | He | F16L 13/143 285/242 |
| 7,654,586 B2 | 2/2010 | Krausz et al. | |
| 7,874,596 B2 | 1/2011 | Kertesz et al. | |
| 8,448,993 B2 | 5/2013 | Cumic et al. | |
| 9,273,811 B1 * | 3/2016 | Webber | F16L 33/2071 |
| 2010/0123310 A1 * | 5/2010 | Miller | F16L 33/20 285/256 |
| 2011/0309613 A1 * | 12/2011 | Trujillo | F16L 33/2073 285/256 |
| 2012/0292900 A1 * | 11/2012 | Bobenhausen | F16L 33/2071 285/336 |

OTHER PUBLICATIONS

"Manure Fittings", 3 pgs, http://cadmanpower.com/manure/fittings.html, downloaded May 15, 2017.

"High Pressure Hose Fittings and Couplings: 6 inch double bolt", 3 pgs, http://www.puckerenterprises.com/store/c11/hose-fittings-high-pressure-hose-fittings-couplings-6-inch-double-bolt/, downloaded May 15, 2017.

* cited by examiner

LIQUID MANURE HOSE COUPLER

CROSS REFERENCE TO RELATED APPLICATIONS

The present application claims the benefit of United States provisional patent application 62/528,099 filed Jul. 1, 2017 of like title and inventorship, the teachings and entire contents which are incorporated herein by reference.

BACKGROUND OF THE INVENTION

1. Field of the Invention

This invention pertains generally to pipe joints or couplings, and more particularly to a hose coupler adapted to securely, safely, and compactly couple together high strength drag hose such as used in liquid manure application.

2. Description of the Related Art

In agricultural operations that include both livestock and crop lands, manure which is a waste by-product from livestock can be used as a beneficial, nutrient rich soil treatment for the crop lands. On larger farms, the manure may be stored in a liquid manure storage tank, lagoon, or the like. To apply the manure to the land, the manure will be pumped from the storage tank through a semi-flexible hose commonly referred to as a drag hose that is in turn coupled to a manure spreader or the like that may, for exemplary purposes, be propelled by a tractor. Typical drag hose has a significant diameter, with common standard diameters available through a range of from four to twelve inches. In addition, each section of the hose may be several hundred yards in length. The liquid manure will be pumped at very high pressures, and so the hose will typically have working pressure ratings measured in several hundreds of pounds per square inch (PSI). Finally, as apparent from the name, the drag hose will be dragged about the crop land behind the tractor and manure spreader, and so will be exposed to abrasion with the earth and potential entanglement with any obstacles. As may be appreciated, this large diameter, very long, durable, high pressure hose is also necessarily very heavy.

As noted herein above, the hose must be connected at one end to the pump or tank, and at the other end to the manure spreader. In addition, while standard hose lengths may extend up to a few hundred yards, there are many situations that require far greater hose lengths.

In consideration thereof, it is also very common for a number of those couplers to be required. In addition to the hose couplers at each end of the hose, there may also be a plurality of couplers intermediate along the hose. These couplers may be provided entirely to extend the total length of hose available. However, in other instances a hose may leak or burst during use. In such a situation, a coupler may be used to splice into the hose to effect a repair.

These hose couplers must be capable of reliably securing the hose sections together, even when very large forces tending to pull apart the sections are applied. This is because, as the hose is dragged around the land, the hose will be under great tension. Noteworthy here is the fact that it is not only the hose being dragged, but also the contents of the hose. Owing to the large hose diameter, a large amount of liquid may be contained within the hose, adding substantially to the total weight of the hose. In addition to withstanding great tension, in the case of an emergency repair as described above the couplers may be installed in the field. In this case, the couplers may be exposed to dirt and debris, and yet must still be readily installed and subsequently operate reliably.

For safe operation, a hose coupler will most preferably be capable of a greater coupling force to the hose than the hose can intrinsically withstand. In the event of a failure, the failure will then occur in the form of a tear in the hose, rather than a separation between the coupler and hose. The latter separation between coupler and hose could dangerously propel the hard coupler through the air. To withstand the great tension forces, high pressures, and potential contaminants at the coupling, artisans have developed very special couplers.

As technology has advanced, new hoses have been developed that are thicker and that can withstand more abrasion and pressure. Unfortunately, the hose wall thickness is greater than prior art clamps were designed for, the hose exterior may fabricated from materials that are less prone to abrasion, and the hoses themselves fail at greater forces and pressures. As a result, many of the prior art couplers are unable to provide a desired strength of connection.

In addition to the many other technical challenges, a drag hose will also typically be wound upon a large spool that may, for exemplary purposes, be carried upon a trailer. When the hose is required, it will be unwound from the spool, and, when no longer required, will be wound again. Unfortunately, couplers that have been developed heretofore have metal portions that protrude beyond the outer diameter of the hose, and in many cases these protrusions are relatively abrupt and even sharp. Unfortunately then, the couplers themselves can harm the hose during winding and unwinding. In addition, the protrusions will also create somewhat more drag and interference with obstacles in the field.

Exemplary U.S. patents that broadly illustrate the more general field of pipe couplers, and of varying relevance, the teachings which are incorporated herein by reference, include: U.S. Pat. No. 280,169 by Gerhauser, entitled "Hose Coupling"; U.S. Pat. No. 756,350 by Garbutt, entitled "Hose Mender"; U.S. Pat. No. 925,013 by Morrison, entitled "Hose Clamp"; U.S. Pat. No. 1,607,943 by Carson et al, entitled "Joint for pipes and other fluid conveyers and containers"; U.S. Pat. No. 1,649,594 by Johnson, entitled "Coupling for armored hose"; U.S. Pat. No. 1,830,782 by Burnish et al, entitled "Coupling for pipe lines"; U.S. Pat. No. 1,854,855 by Kisaburo, entitled "Pipe joint"; U.S. Pat. No. 1,857,297 by Faulkner, entitled "Pipe coupling"; U.S. Pat. No. 1,935,425 by Wiggins, entitled "Pipe fitting"; U.S. Pat. No. 1,996,855 by Cheswright, entitled "Hose pipe nipple or connecter"; U.S. Pat. No. 2,028,182 by Barnickol jr, entitled "Coupling"; U.S. Pat. No. 2,259,453 by Beyer et al, entitled "Coupling unit"; U.S. Pat. No. 2,474,431 by Lipman et al, entitled "Clamp"; U.S. Pat. No. 2,778,662 by Smith, entitled "Axially and radially sealed divided sleeve type pipe clamp"; U.S. Pat. No. 2,962,305 by McCarthy et al, entitled "Coupling for reinforced resinous pipe"; U.S. Pat. No. 3,006,663 by Bowne, entitled "Pipe Clamp with Resilient Member"; U.S. Pat. No. 3,056,617 by Snoody, entitled "High Pressure Fitting"; U.S. Pat. No. 3,495,853 by Furrer, entitled "Joint for high pressure pipeline or the like"; U.S. Pat. No. 3,679,241 by Hoffmann, entitled "Compression pipe coupling"; U.S. Pat. No. 3,737,179 by White jr, entitled "Submarine connection for misaligned pipes"; U.S. Pat. No. 3,967,837 by Westerlund et al, entitled "High Pressure Coupling Apparatus"; U.S. Pat. No. 4,300,792 by Donnelly, entitled "Pipe assembly"; U.S. Pat. No. 4,480,860 by Foresta et al, entitled "Transition Coupling and clamp assembly containing same"; U.S. Pat. No. 4,538,839 by Ledgerwood, entitled "Pipe joint coupling"; U.S. Pat. No. 4,564,201 by Hannah, entitled "Method and apparatus for sealing a discontinuity in a tubular assembly"; U.S. Pat. No. 5,004,275 by Miller, entitled "Clamp"; U.S. Pat. No. 5,098,134 by Monckton, entitled "Pipe Connection Unit"; U.S. Pat. No. 5,176,409 by Brooks, entitled "High Pressure Pipe Coupling"; U.S. Pat. No. 7,654,586 by Krausz et al, entitled "Pipe Seal Element"; U.S. Pat. No. 7,874,596 by Kertesz et al, entitled "Connecting arrangement with end sections of two fluid conduits to be connected"; and U.S. Pat. No. 8,448,993 by Cumic et al, entitled "Pipe coupling".

In addition to the foregoing patents, Webster's New Universal Unabridged Dictionary, Second Edition copyright 1983, is incorporated herein by reference in entirety for the definitions of words and terms used herein.

As may be apparent, in spite of the enormous advancements and substantial research and development that has been conducted, there still remains a need for a coupler that is compatible with the newer heavier drag hose, which will not interfere with or harm the hose during winding and unreeling, and which will produce less drag and be less likely to produce interference with obstacles in the field.

SUMMARY OF THE INVENTION

In a first manifestation, the invention is a liquid manure hose coupler end. A body defines an exterior wall and an interior passageway passing entirely through the body in a longitudinal direction. At least two ribs and at least two grooves each circumscribe the interior passageway and are configured to engage with a hose. A sleeve seal ring is configured to form a seal between a sleeve extending from the liquid manure hose coupler end and the liquid manure hose coupler end. A first collar secures the hose to a first one of the at least two ribs and a first one of the at least two grooves. A second collar secures the hose to a second one of the at least two ribs and a second one of the at least two grooves.

In a second manifestation, the invention is a liquid manure hose coupler end. A body defines an exterior wall and an interior passageway passing entirely through the body in a longitudinal direction from a first end to a second end. At least two ribs and at least two grooves each circumscribe the interior passageway and are configured to engage with a hose. A first rib is adjacent to the body first end and defines a peak at a greatest outside diameter of the first rib. A first groove is adjacent to the first rib and is separated from the body first end by the first rib. The first rib has a sloped side wall defining a tapered transition from the first rib peak to the first groove. A second rib is adjacent to the first groove and is separated from the body first end by the first rib and first groove. A second groove is adjacent to the second rib and is separated from the body first end by the first rib, first groove, and second rib. A third rib has a sloped side wall defining a tapered transition from a peak at a greatest outside diameter of the third rib to the second groove.

In a third manifestation, the invention is a liquid manure hose coupler defining first and second liquid manure hose coupler ends, each having a generally cylindrical body terminating at an end face, a clamp ridge adjacent to the end face, and a clamp groove adjacent to the clamp ridge and spaced from the end face by the clamp ridge. A clamp secures the two hose coupler ends together. The clamp has a pair of opposed ring halves separated from each other by a first gap; a hinge pivotally coupling the pair of opposed ring halves to each other; and a closure spaced from the hinge and extending into the first gap, the closure having a securing hole. A fastener removably passes through the securing hole, the fastener having an enlarged head unable to pass into the securing hole and located at least partially within the first gap.

OBJECTS OF THE INVENTION

Exemplary embodiments of the present invention solve inadequacies of the prior art by providing a hose coupler having improved clamping features. As will become apparent from the subsequent descriptions, the present invention may also be applied in other industries where strong and safe hose connections are desired.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a liquid manure drag hose coupler for use in agricultural operations where manure is used as a beneficial, nutrient rich soil treatment for the crop lands, to couple drag hoses that run between a liquid manure storage tank and a manure spreader. A second object of the invention is to provide a liquid manure drag hose coupler capable of reliably securing a pair of hose sections together. Another object of the present invention is to provide a liquid manure drag hose coupler that may be readily installed in the field, even when exposed to dirt and debris, and yet will subsequently operate reliably. A further object of the invention is to provide a liquid manure drag hose coupler that will most preferably be capable of a greater coupling force to the hose than the hose can intrinsically withstand. Yet another object of the present invention is to provide a liquid manure drag hose coupler that is compatible with newer, heavier, and more advanced hoses that can withstand more abrasion and pressure. An additional object of the present invention is to provide a liquid manure drag hose coupler having minimal protrusions, so as to not interfere with or harm the hose during winding and unreeling upon a large spool, and which will also create less drag and interference with obstacles when dragged about the field.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
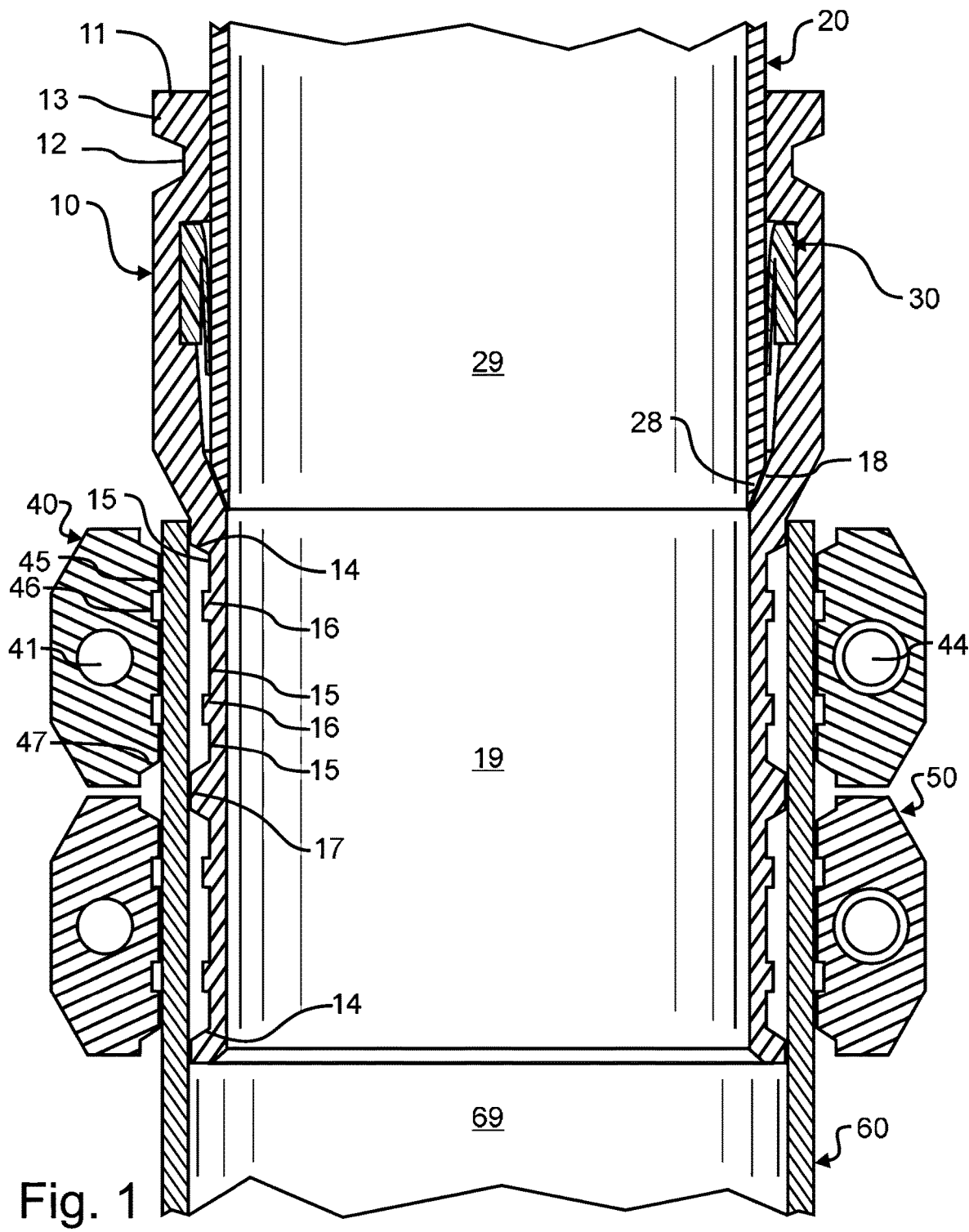
FIG. 1 illustrates one coupler end of a preferred embodiment liquid manure hose coupler, including the sleeve, seal ring, a pair of collars, and an unsecured hose, but without the coupling clamp, designed in accord with the teachings of the present invention from a top plan view.
Figure 2:
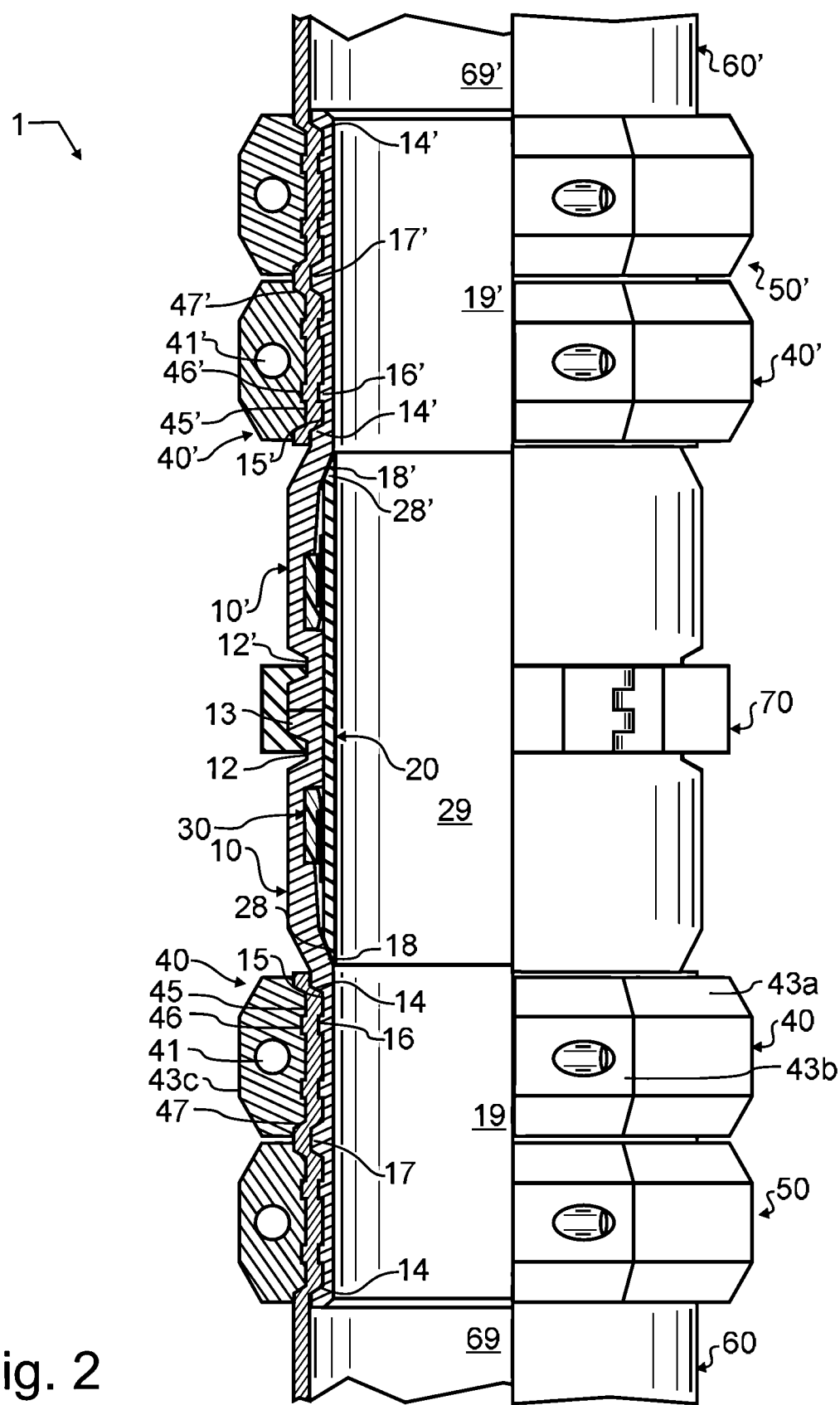
FIG. 2 illustrates the preferred embodiment liquid manure hose coupler from a longitudinally quarter-sectioned top plan view.

Manifested in the preferred embodiment, the present invention provides a hose coupler 1 having improved clamping features. One coupler end 10 of preferred embodiment liquid manure hose coupler 1 is illustrated in FIG. 1 from a sectional view, in combination with a prior art drag hose 60. The fully assembled hose coupler 1 is illustrated in FIG. 2, providing a pair of coupler ends 10, 10' that are coupled together. With reference to these Figures, a first end face 11 terminates preferred embodiment liquid manure hose coupler end 10 distal to hose 60. Adjacent to first end face 11 is a clamp ridge 13, and next to that but somewhat more distal to first end face 11 is a clamp groove 12. As will be described in greater detail herein below, clamp groove 12 provides an engagement for a clamp 70, and allows preferred embodiment liquid manure hose coupler end 10 to be clamped to a second like preferred embodiment liquid manure hose coupler end 10'.

In the vicinity of clamp groove 12 and protruding from first end face 11 is a sleeve 20. Sleeve 20 has a pair of tapered ends 28, and defines a sleeve inside diameter 29 of like dimension with hose coupler end inside diameter 19, the combination creating a smooth passage through which liquid may pass relatively unobstructed. Both of the sleeve inside diameter 29 and hose coupler end inside diameter 19 will preferably have an inside diameter also very similar to the drag hose inside diameter 69. A slight bevel at the interior end of preferred embodiment liquid manure hose coupler end 10 distal to end face 11 may optionally be provided to further assist in reducing the drag on liquid passing through preferred embodiment liquid manure hose coupler end 10, and also thereby reducing any likelihood of accumulation of matter or clogging.

To prevent liquid from escaping between sleeve 20 and preferred embodiment liquid manure hose coupler end 10, a sleeve seal ring 30 is provided therebetween. Preferred embodiment liquid manure hose coupler end 10 is provided with an internal beveled sleeve engaging edge 18 that is preferably configured to compatibly engage with a sleeve tapered end 28.

At the end of preferred embodiment liquid manure hose coupler end 10 distal to end face 11 is a hose coupling configured to securely couple to drag hose 60. Defining the start and finish of the hose coupling are a pair of oppositely sloped transition half-ribs 14. Intermediate therebetween are a plurality of hose grooves 15 and hose ribs 16. Hose grooves 15 and hose ribs 16 are designed to mate with collar ribs 45 and collar grooves 46, respectively. As illustrated in FIG. 1, collars 40 and 50 are in a pre-installed configuration, and will be tightened using socket head bolts 42 as described and illustrated herein below. Most preferably, when collars 40 and 50 are fully installed and tightened, the relative dimensions of hose grooves 15 and collar ribs 45 are such that drag hose 60 will be securely held therein, but without the likelihood of piercing the outer hose wall. This preserves the integrity of the outer hose wall and thereby prevents moisture from penetrating the hose and damaging reinforcing weave.

To preserve integrity of the hose wall, in one preferred embodiment of the invention hose ribs 16 extend in the longitudinal direction of preferred embodiment liquid manure hose coupler 1 less than the longitudinal extent of collar grooves 46. In a further embodiment, the difference between the longitudinal extension of hose ribs 16 parallel to the longitudinal axis of preferred embodiment liquid manure hose coupler 1 and the longitudinal extension of collar grooves 46 in the same direction is approximately twice the width of an operatively held or compressed hose 60. By such arrangement, there will be sufficient space for the hose to fit between the longitudinal extreme edges of hose ribs 16 and collar grooves 46. Similarly, hose grooves 15 and collar ribs 45 are also dimensioned to securely hold drag hose 60 therein, but without the likelihood of piercing the outer hose wall.

In prior art hose couplers, a single ribbed collar would engage with a set of ribs and grooves on the hose coupler. However, as the tension forces placed upon the hose and coupler have increased, the length of the collar and number of grooves and ribs has also increased. This undesirably increases the total length of a hose coupler, which prevents the coupler from laying flat or reasonably flat within a hose reel. Furthermore, the stress upon the hose at the first rib and groove can be profound, and can lead to undesirable stress concentration and failure. While some in the prior art of hose couplers have proposed knurled or abrasive surfaces on the coupler that frictionally engage with the hose, these can create substantial stress concentration within the hose sheath, or even pierce the hose sheath, exposing the reinforcing weave to moisture and thereby accelerating failure of the hose.

To alleviate these problems of the prior art, the present invention incorporates sloped transition half-ribs 14 that are of larger outside diameter than the outside diameter of hose ribs 16. The optional but preferred larger diameter ensures that these sloped transition half-ribs 14 are active in securing to drag hose 60, while also providing much less stress in the hose, owing to the more gradual non-perpendicular transition between larger outside diameter of half-ribs 14 and smaller outside diameter of hose grooves 15. These sloped surfaces do not bite into and damage the hose sheathing, but do contribute to and thereby distribute the total tensile holding capability through a larger region of hose 60.

Further compounding this effect is the provision of two collars 40, 50, each preferably of like construction, and an additional collar separating rib 17. As apparent from FIG. 1, collar separating rib 17 has a like geometry to half-ribs 14, but provides a full rib with each edge sloped gradually back into an adjacent groove 15.

The use of two collars 40, 50 provides several benefits not found in the prior art. If an installer were to accidentally fail to fully tighten one or the other of the two collars, the combination of two collars may still provide a safe and secure connection. In addition, the large angle transition at collar separating rib 17 and collar sloped transition edges 47 also provides substantial holding power, again without stressing the drag hose sheath.

Sleeve 20 has a relatively simple cylindrical geometry, with a pair of externally tapered ends 28 terminating each end of the cylindrical body. As is apparent from FIG. 1, sleeve 20 protrudes from end face 11. The installation of sleeve 20 into preferred embodiment liquid manure hose coupler end 10 is a simple matter of sliding sleeve 20 down past sleeve seal ring 30 and into positive engagement with beveled sleeve engaging edge 18. Illustrated in FIG. 2, a second preferred embodiment liquid manure hose coupler end 10' has been provided that encompasses that portion of sleeve 20 that was protruding in FIG. 1.

Figure 3:
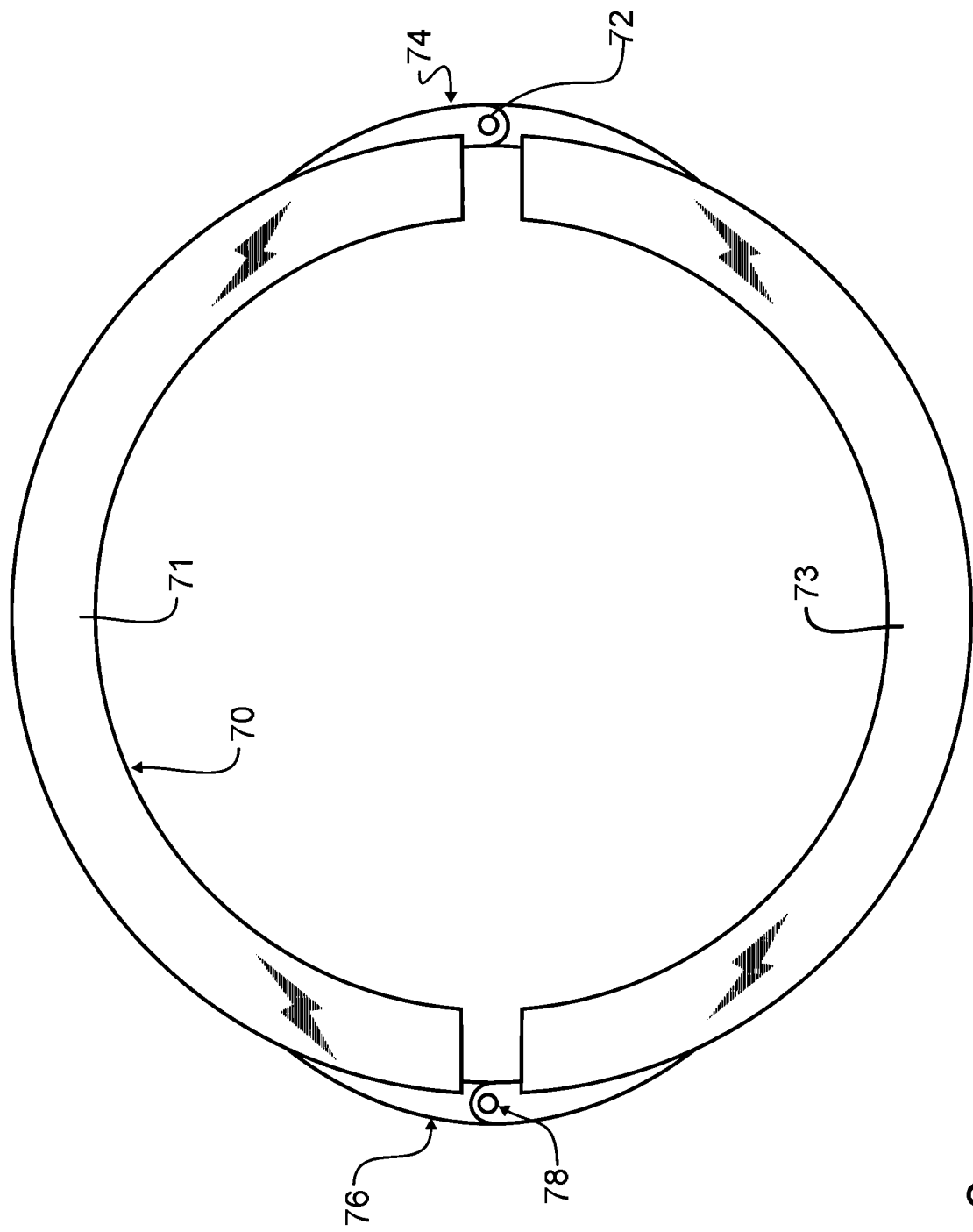
FIG. 3 illustrates the preferred embodiment clamp for use in the preferred embodiment liquid manure hose coupler illustrated in FIG. 1, in a closed position from an end view.

FIG. 3 illustrate a preferred embodiment liquid manure hose clamp 70, in closed position. Preferred embodiment liquid manure hose clamp 70 has been designed to be compatible with prior art liquid manure hose couplers, but also provides additional novelty and benefit in combination with the pair of preferred embodiment liquid manure hose coupler ends 10, 10' illustrated in FIG. 2. Clamp 70 is generally an annular ring having a U-shaped cross-section, except at closure 74 and hinge 76. Nevertheless, at both of closure 74 and hinge 76 the annular geometry has been maintained as closely as possible. The annular ring geometry is created by two ring halves 71, 73 that together define a ring. However, closure 74 is interspersed within a small gap between the two ring halves 71, 73, which permits securing hole 72 to exist more closely to the ring center than possible in the prior art. In other words, the wall that defines securing hole 72 is in line with the outer wall of ring halves 71, 73. This saves at least some portion of the fastener nut or bolt head dimension. However, in contrast to the prior art, in the present invention there is even more of a diameter reduction, since the prior art clamps are displaced even further from the ring center. While material could also be removed to accommodate a similar fastener at hinge 76, instead a pin 78 is pressed in place that provides a suitable pivot between ring halves 71, 73.

While these changes to clamp 70 may appear to be relatively minor and only provide a small amount of reduced dimension, as noted herein above drag hoses may be very long and heavy, and as these are wound upon the storage and transport reel, any portion of the clamp which protrudes will be driven with great force into adjacent hose already would upon the reel. As also noted herein above, this can cause substantial damage to the hose. In addition, the protrusions of the prior art will also be much more prone to entangling with objects within the field. In contrast, the present clamp 70 drastically reduces the likelihood and extent of damage.

In addition to the low profile, the preferred embodiment liquid manure hose clamp 70 is fabricated from a machined pipe, rather than by rolling or deforming sheet metal as done by many in the prior art. With properly fabricated and treated material, hose clamp 70 is substantially stronger and more reliable than the rolled and deformed prior art.

The radially extending and interior ledges of ring halves 71, 73 engage with clamp grooves 12, and thereby pull together the two preferred embodiment liquid manure hose couplers 10, 10' and hold them together about sleeve 20. When a liquid manure hose coupler designed in accord with the teachings of the present invention is clamped and operational, end faces 11 and 11' may or may not be in contact. Debris from the field could interfere with a proper connection if the parts were dimensioned without tolerance. However, the preferred embodiment provides the ability for there to be a small gap between the adjacent end faces 11 and 11'. Some of the tolerance is achieved by offsetting sleeve seal ring 30 from beveled sleeve engaging edge 18. In other words, if there is some matter that packs between adjacent end faces 11 and 11', there will still be some limited ability for tapered end 28 to separate slightly from beveled sleeve engaging edge 18. Sleeve seal ring 30 will still maintain the seal between preferred embodiment liquid manure hose coupler end 10 and sleeve 20. Furthermore, the slight V-groove geometry of clamp groove 12 will help to draw adjacent end faces 11 and 11' together as clamp 70 is secured, but once again will accommodate minor offsets therebetween.

As illustrated in FIG. 1, collars 40 and 50 are in a pre-installed or expanded configuration. Within collar 40, three collar segments 43 (numbered in FIG. 2) are provided. Each of collar segments 43 are coupled to adjacent segments by a socket head bolt 42 passing through a securing hole 41 and into a threaded sleeve 44. By withdrawing socket head bolts 42 from securing holes 41, the diameter of collar 40 is increased sufficiently to be slid around hose 60 prior to sliding hose 60 onto preferred embodiment liquid manure hose coupler end 10. At this moment, the combination of preferred embodiment liquid manure hose coupler end 10 and collar 40 will appear as shown in FIG. 1. As already noted herein above, most preferably two like collars 40, 50 will be located circumferentially around hose 60, again as illustrated in FIGS. 1 and 2.

Once collar 40 is properly positioned, socket head bolts 42 will be tightened using an Allen wrench. This will draw collar 40 into the smaller diameter closed configuration illustrated in FIG. 2. Preferably, clamp 40 will be tightened first, which will anchor drag hose 60 to preferred embodiment liquid manure hose coupler end 10. Because of the variations in diameter at the ribs and grooves 15, 16, 17, 45, 46, 47, as collar 40 is tightened there will be a slight drawing of the bulk of drag hose 60 toward end face 11. Next, collar 50 is tightened, and again there will be a slight drawing of the bulk of drag hose 60 toward end face 11.

The preferred embodiment liquid manure hose coupler end 10 in combination with sleeve 20, sleeve seal ring 30, collars 40, 50, and clamp 70 provide a much stronger coupling for drag hose 60 than was heretofore available. Further, the geometry of ribs and grooves significantly reduces the stress generated within a drag hose under tension in the region adjacent to the coupler. As a result, a coupler designed in accord with the teachings of the present invention may be fabricated to be shorter than those of the prior art, permitting the coupler to wind tighter when the drag hose is rolled onto a reel. Furthermore, a clamp designed in accord with the teachings of the present invention is much more flush with the balance of the coupler, and so will be much less likely to harm adjacent drag hose on the reel, and will also be less prone to snagging while being dragged about in the field.

While the foregoing details what is felt to be the preferred embodiment of the invention, no material limitations to the scope of the claimed invention are intended. Further, features and design alternatives that would be obvious to one of ordinary skill in the art are considered to be incorporated herein. As will be appreciated, while the hose coupler described herein above has many features optimal for use with liquid manure drag hose, various features will be applicable to other applications. Consequently, it will be understood herein that the present invention will find application for other types of hoses and purposes, each which are understood to be incorporated herein. The scope of the invention is set forth and particularly described in the claims herein below.

We claim:

1. A liquid manure hose coupler end, comprising:
   a body defining an exterior wall and an interior passageway passing entirely through said body in a longitudinal direction from a first end to a second end;
   at least three hose ribs and at least two hose grooves, each forming a part of said body exterior wall and circumscribing said interior passageway and configured to engage with a hose;
   a first hose rib of said at least three hose ribs adjacent to said body first end and defining a peak at a greatest outside diameter of said first hose rib;
   a first hose groove of said at least two hose grooves adjacent to said first hose rib and separated from said body first end by said first hose rib;
   said first hose rib having a sloped side wall defining a tapered transition from said first hose rib peak to said first hose groove;

a second hose rib of said at least three hose ribs adjacent to said first hose groove and separated from said body first end by said first hose rib and said first hose groove;

a second hose groove of said at least two hose grooves adjacent to said second hose rib and separated from said body first end by said first hose rib, said first hose groove, and said second hose rib;

said second hose rib having a generally cylindrical outer surface defining a greatest diameter, a first rib side wall defined within a radial plane and extending from said generally cylindrical outer surface to said first hose groove, and a second rib side wall defined within a radial plane and extending from said generally cylindrical outer surface to said second hose groove;

a third hose rib of said at least three hose ribs having a sloped side wall defining a tapered transition from a peak at a greatest outside diameter of said third hose rib to said second hose groove;

further comprising: a third hose groove of said at least two hose grooves adjacent to said third hose rib and more distal to said body first end than said third hose rib; a fourth hose rib of said at least three hose ribs adjacent to said third hose groove and more distal to said body first end than said third hose groove; a fourth hose groove of said at least two hose grooves adjacent to said fourth hose rib and more distal to said body first end than said fourth hose rib; and a fifth hose rib of said at least three hose ribs adjacent to said fourth hose groove and more distal to said body first end than said fourth hose groove, said fifth hose rib having a sloped side wall defining a tapered transition from a peak at a greatest outside diameter of said fifth hose rib to said fourth hose groove; a first collar circumscribing said first and second hose grooves and said second hose rib and configured to secure a hose to said first, second, and third hose ribs and said first and second hose grooves, and a second collar separate from and configured to function independently of said first collar, said second collar circumscribing said third and fourth hose grooves and said fourth hose rib and configured to secure said hose to said third, fourth, and fifth hose ribs and said third and fourth hose grooves.

2. The liquid manure hose coupler end of claim 1, wherein said first hose rib peak has an outside diameter greater than a greatest outside diameter of said second hose rib, and said greatest outside diameter of said second hose rib is greater than a greatest outside diameter of said first hose groove.

3. The liquid manure hose coupler end of claim 2, wherein said third hose rib peak has an outside diameter greater than said greatest outside diameter of said second hose rib.

4. The liquid manure hose coupler end of claim 1, wherein said first collar further comprises:
at least one collar rib configured to align with and deform said hose into said first hose groove and about said at least one collar rib; and
at least one collar groove configured to align with and deform said hose about said first hose rib and into said at least one collar groove.

5. The liquid manure hose coupler end of claim 1, wherein said second collar further comprises:
at least one second collar rib configured to align with and deform said hose into said third hose groove and about said at least one second collar rib; and
at least one second collar groove configured to align with and deform said hose about said fourth hose rib and into said at least one second collar groove.

6. The liquid manure hose coupler end of claim 4, wherein said at least one collar rib extends in said body longitudinal direction less than the longitudinal extent in said body longitudinal direction of said first hose groove.

7. The liquid manure hose coupler end of claim 6, wherein a difference in the longitudinal extent in said body longitudinal direction between said at least one collar rib and said first hose groove is approximately twice the thickness of an operatively held compressed hose.

8. The liquid manure hose coupler end of claim 1, wherein said at least two hose ribs further comprises at least three hose ribs;
a hose first rib of said at least three hose ribs adjacent to said body first end and defining a peak at a greatest outside diameter of said first hose rib;
a first hose groove of said at least two hose grooves adjacent to said first hose rib and separated from said body first end by said first hose rib;
said first hose rib having a sloped side wall defining a tapered transition from said first hose rib peak to said first hose groove;
a hose second rib of said at least three hose ribs adjacent to said first hose groove and separated from said body first end by said first hose rib and said first hose groove;
a second hose groove of said at least two hose grooves adjacent to said second hose rib and separated from said body first end by said first hose rib, said first hose groove, and said second hose rib; and
a third hose rib of said at least three hose ribs having a sloped side wall defining a tapered transition from a peak at a greatest outside diameter of said third hose rib to said second hose groove.

9. In combination, a first indeterminate length liquid manure hose, a second indeterminate length liquid manure hose, and a liquid manure hose coupler securing said first indeterminate length liquid manure hose to said second indeterminate length liquid manure hose, said liquid manure hose coupler comprising:
first and second liquid manure hose coupler ends, each having
a body defining an exterior wall and an interior passageway passing entirely through said body in a longitudinal direction;
seven hose ribs and six hose grooves, each most nearly adjacent pair of said seven hose ribs separated by a one of said six hose grooves, each one of said seven hose ribs and said six hose grooves forming a part of said body exterior wall and configured to engage with a hose;
a first collar securing said hose to a first four of said seven hose ribs and a first three of said six hose grooves; and
a second collar immediately adjacent to and separable from said first collar, said second collar securing said hose to a second four of said seven hose ribs and a second three of said six hose grooves;
a sleeve extending from said first liquid manure hose coupler end to said second liquid manure hose coupler end;
a first sleeve seal ring configured to form a seal between said sleeve and said first liquid manure hose coupler end;
a second sleeve seal ring configured to form a seal between said sleeve and said second liquid manure hose coupler end; and a releasable clamp removably securing said first liquid manure hose coupler end to said second liquid manure hose coupler end.

10. The combination first indeterminate length liquid manure hose, second indeterminate length liquid manure hose, and liquid manure hose coupler of claim 9,
    wherein said seven hose ribs further comprise a first, fourth, and seventh hose rib each having a greater outside diameter than an outside diameter of a second, third, fifth, and sixth hose rib,
    wherein said second and third hose ribs are located between said first and fourth hose ribs,
    wherein said fifth and sixth hose ribs are located between said fourth and seventh hose ribs,
    wherein said first collar secures said hose to said first, second, third, and fourth hose ribs and has first and second collar grooves aligned radially with said second and third hose ribs, said second and third hose ribs pressing said hose securely into said first and second collar grooves, and
    wherein said second collar secures said hose to said fourth, fifth, sixth, and seventh hose ribs and has two collar grooves aligned radially with said fifth and sixth hose ribs, said fifth and sixth hose ribs pressing said hose securely into said two collar grooves.

* * * * *